Sept. 13, 1949.
G. PRUITT
2,481,948
TONGUE-SUPPORTING DOLLY
Filed Feb. 20, 1948
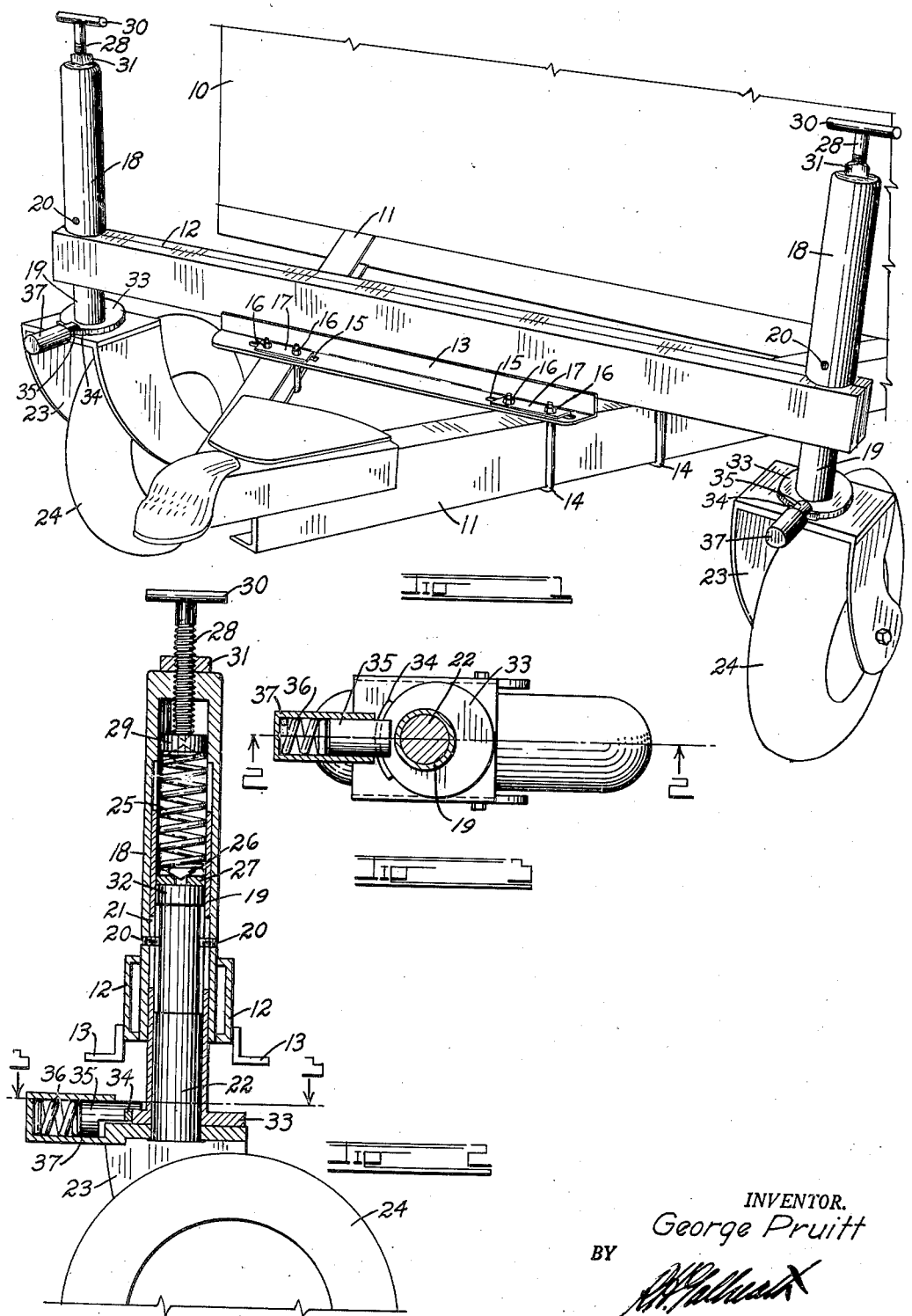
INVENTOR.
George Pruitt
BY
ATTORNEY Patented Sept. 13, 1949

2,481,948

UNITED STATES PATENT OFFICE 2,481,948

TONGUE-SUPPORTING DOLLY

George Pruitt, Arvada, Colo.

Application February 20, 1948, Serial No. 9,863

1 Claim. (Cl. 280—61)

This invention relates to a front wheel dolly for use on automotive trailers, more particularly on house trailers, and has for its principal object the provision of a highly efficient device which can be quickly and easily and rigidly attached to the tongue of a conventional trailer, and which will act to relieve the load on the towing vehicle and resiliently support the forward extremity of the trailer.

Another object of the invention is to provide means for preventing the dolly wheels from "fishtailing" or whipping.

A still further object is to provide efficient and easily adjustable means for adapting the dolly trailer for different heights.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved trailer dolly, illustrating it in place on the tongue of a conventional house trailer;

Fig. 2 is a vertical section through a wheel post employed on the improved dolly, the section being taken on the line 2—2, Fig. 3; and Fig. 3 is a detail, horizontal section, taken on the line 3—3, Fig. 2.

In the drawing, a conventional house trailer is indicated at 10, with its A-shaped towing tongue at 11.

The invention consists of two channel-like structural members with their concave sides placed together and welded along their flanges to form a hollow cross beam 12. A supporting angle 13 is welded to each side of the mid-portion of the cross beam 12. The angles 13 project downwardly from the cross beam 12 and rest upon the tongue 11. They are atttached to the tongue by means of U-bolts 14 which surround the side members of the tongue 11 and extend upwardly through elongated openings 15 in the bottom flanges of the supporting angles 13, terminating in clamp nuts 16 which may be tightened against separator plates 17.

A guide tube 18 extends through the beam 12 adjacent each extremity thereof. The guide tubes 18 extend upwardly from the beam 12 at outwardly inclined angles, that is, they are more widely separated at their tops than at their bottoms. A plunger sleeve 19 extends upward into each guide tube through the open bottom thereof. The plunger tube is free to move vertically in the guide tube 18, but is prevented from rotating therein by means of two set screws 20 which are threaded through the wall of the tube 18 into vertical slots 21 in the walls of the sleeve 19.

A wheel post 22 extends downward from each sleeve 19, terminating at its bottom in a wheel yoke 23 in which a pneumatically tired caster wheel 24 is rotatably mounted. The posts 22 are welded or otherwise permanently secured to the wheel yokes 23.

The up thrust of the wheel posts is absorbed by compression springs 25. The lower extremity of each spring rests against a conical thrust bearing 26, which in turn rests against a thrust washer 27 so that the post 22 may rotate freely without rotating the spring.

The normal projection of the sleeve 19 and the post 22 from the guide tube 18 is adjustable by means of a jack screw 28 threaded through the top of each guide tube 18. The jack screws terminate in spring plungers 29, against which the upper extremity of each spring rests. The jack screws may be rotated by means of handles 30, and they may be locked in any pre-set position by means of lock nuts 31.

The upper portion of each post 22 is reduced in diameter and terminates in a retaining flange 32. The set screws 20 extend into the space formed by the reduction in diameter so as to limit the upward and downward movement of the posts while allowing them to freely rotate.

The lower extremity of each sleeve 19 carries an eccentric cam 33 welded or otherwise secured thereto. The cam rests against the top of each wheel yoke 23. A brake shoe 34 is constantly pressed against the periphery of the cam 33 by means of a spring plunger 35. The spring plunger 35 is urged toward the cam by means of a compression spring 36 mounted in a spring cup 37.

The cups 37 are formed on, or welded to, the forward edges of the wheel yokes 23 and extend forwardly therefrom. The spring plunger 35 overlaps the cam 33 to cause the latter to move in vertical unison with the wheel yokes 23.

It can be readily seen that the device can be quickly and easily attached to any conventional A-shaped tongue 11 by means of the U-bolts 14, the slots 15 allowing lateral adjustments to accommodate different widths of tongues. The weight of the forward portion of the trailer causes the guide tubes 18 to move downwardly on the plunger sleeves 19 under control of the resilient springs 25.

The wheels 24 may turn when negotiating curves, since the posts 22 are rotatable in the sleeves 19. In turning, however, the brake shoes 34 must climb the eccentricity of the cams 33 so that the turning is resisted. This resistance prevents wavering or "fishtailing" of the wheels, yet does not prevent steering, towing, or backing of the trailer.

Upward and downward movements of the trailer chassis are absorbed by the guide tubes 18 riding over the sleeves 19 so that all road shocks are absorbed. The outward incline of the guide tubes places a camber in the wheels to cause them to naturally follow a straight-ahead position.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A dolly for supporting the tongue of a trailer, comprising: a cross beam; means for attaching said cross beam to said tongue so that said cross beam will project laterally from both sides thereof; two guide tubes, there being one guide tube extending through said cross beam and upwardly therefrom adjacent each extremity thereof; a wheel post rotatably mounted in each guide tube and extending downwardly therefrom; a wheel yoke mounted on the lower extremity of each wheel post; a caster wheel rotatably mounted in each wheel yoke; a compression spring positioned in the upper portion of each guide tube and absorbing the upthrust of said post; a thrust sleeve surrounding each wheel post within each guide tube; means for preventing rotation of said thrust sleeve, yet allowing vertical movement thereof; an eccentric cam member mounted on the lower extremity of each thrust sleeve, the axis of eccentricity being positioned normally rearward of said posts; braking means carried by said wheel yokes; and springs urging said braking means into contact with said eccentric cam member for resisting rotation of said wheel yokes, with reference to said thrust sleeves.

GEORGE PRUITT.

REFERENCES CITED

The following references are of record in the file of this patent:

UNITED STATES PATENTS

| Number | Name | Date |
|---|---|---|
| 1,409,150 | Blood | Mar. 14, 1922 |
| 1,896,234 | Hathorn | Feb. 7, 1933 |
| 1,944,185 | Langer | Jan. 23, 1934 |
| 2,021,886 | Carpenter et al. | Nov. 26, 1935 |
| 2,176,551 | Solem | Oct. 17, 1939 |
| 2,350,624 | McDaniel | June 6, 1944 |
| 2,379,170 | McDaniel | June 26, 1945 |
| 2,447,659 | McDaniel | Aug. 24, 1948 |